United States Patent [19]

Seeholzer et al.

[11] Patent Number: 5,167,849

[45] Date of Patent: Dec. 1, 1992

[54] FLOCCULATION AND/OR FIXING AGENT FOR PAPER SIZING

[75] Inventors: Josef Seeholzer, Trostberg; Joachim von Seyerl, Seeon, both of Fed. Rep. of Germany

[73] Assignee: SKW Trostberg Aktiengesellschaft, Trostberg, Fed. Rep. of Germany

[21] Appl. No.: 809,239

[22] Filed: Dec. 17, 1991

Related U.S. Application Data

[63] Continuation of Ser. No. 284,313, Dec. 14, 1988.

[30] Foreign Application Priority Data

Dec. 17, 1987 [DE] Fed. Rep. of Germany ....... 3742764

[51] Int. Cl.$^5$ .................. C09K 3/00; D21H 11/00; C08L 61/02; C02F 1/52
[52] U.S. Cl. ..................... 252/60; 252/180; 210/728; 210/735; 162/164.6; 162/181.2; 525/398
[58] Field of Search .......... 252/60, 180, 181; 162/164.6, 166, 181.2; 210/729, 725, 735, 728; 525/398

[56] References Cited

U.S. PATENT DOCUMENTS

| | | | |
|---|---|---|---|
| 3,544,476 | 12/1970 | Aiba et al. | 252/175 |
| 3,626,024 | 12/1971 | Gutweiler et al. | 525/398 |
| 3,957,574 | 5/1976 | Anderson | 162/166 |
| 3,960,648 | 6/1976 | Nakajima et al. | 210/727 |
| 3,976,824 | 8/1976 | Ariyoshi et al. | 162/166 |
| 4,025,429 | 5/1977 | Neuschutz | 252/180 |
| 4,155,847 | 5/1979 | Tanaka et al. | 210/729 |
| 4,366,267 | 12/1982 | Everett | 525/398 |
| 4,559,143 | 12/1985 | Asada et al. | 210/728 |
| 4,656,059 | 4/1987 | Mizuno et al. | 210/729 |
| 5,026,457 | 6/1991 | Eichinger et al. | 162/166 |

FOREIGN PATENT DOCUMENTS

| | | |
|---|---|---|
| 200002 | 3/1986 | European Pat. Off. |
| 2515175 | 10/1975 | Fed. Rep. of Germany |
| 3500408 | 7/1986 | Fed. Rep. of Germany |
| 50-111864 | 9/1975 | Japan |
| 58-174696 | 10/1983 | Japan |
| 1512022 | 5/1978 | United Kingdom |

OTHER PUBLICATIONS

Database WPIL, No. 83-823453, Derwent Publications Ltd., London, GB; and JP-A-58174696 (Mitsubishi Paper Mill) 13 Oct. 1983.

Chem Abstracts, RN 1327-41-9, Aluminum Chlorhydrate.

Primary Examiner—Prince Willis, Jr.
Assistant Examiner—James M. Silbermann
Attorney, Agent, or Firm—Felfe & Lynch

[57] ABSTRACT

The present invention provides a flocculation and/or fixing agent for paper sizing in the weakly acidic to weakly alkaline pH range, wherein it contains or consists to a preponderant amount of a mixture and/or a co-condensation product of the components cationic dicyandiamide resin and polyaluminium hydroxy compound.

The present invention also provides processes for the production of this agent.

4 Claims, No Drawings

FLOCCULATION AND/OR FIXING AGENT FOR PAPER SIZING

This application is a continuation of application Ser. No. 07/284,313, filed Dec. 14, 1988, now pending.

The present invention is concerned with a flocculation and/or fixing agent for paper sizing in a weakly acidic to weakly basic pH range.

In the case of sizing paper, millboard, cardboard and the like cellulose-containing materials with a resin size, a flocculation or fixing agent is used for precipitating or binding the resin size on the fibre surface. A complete flocculation of the size used is important for a good sizing of the paper in order that the sieve water remains as free as possible from size and thus disturbances by subsequent resin depositions are avoided. For economic reasons, the required amounts of the flocculation or fixing agent used should be kept as small as possible.

In practice, three different sizing processes are used, according to the particular pH value. In the case of the first process, acid sizing, alum (aluminium sulphate hydrate) is usually employed. A disadvantage of acid sizing is that the economically favorable filling material chalk cannot be used because of the decomposition thereof. Furthermore, due to the loading of the waste water because of the high sulphate content, the process is also not without problems. Finally, paper produced in this way is not stable against aging.

In the case of the second process, pseudoneutral sizing, for fixing there is used either only a little alum or, instead of alum, sodium aluminate. However, the pH value in the pulp slurry must hereby be maintained exactly in order to obtain a sizing at all. Furthermore, in the case of these conditions, these fixing materials display only a limited effectiveness.

In the case of the third process, the attempt is made to size the cellulose-containing material under neutral conditions. However, the use of alum is thereby not possible because, in the neutral or weakly basic range, the content of free aluminium ions decreases very quickly as a result of precipitations and thus the size only flocculates out incompletely.

Therefore, according to Swiss Patent Specification No. 623,371, instead of alum, there were used practically sulphate-free aluminium polyhydroxy chlorides as flocculation agents. These compounds admittedly behave somewhat better than alum but here, too, at a pH of 7, even after a short time, the positive charge of the aluminium ion is lost because of premature precipitating out, i.e. the effectiveness decreases very quickly. Therefore, the usual natural resin sizes could not be used in the case of this paper manufacture under neutral conditions but rather it was necessary to return to the use of synthetic sizes, which makes the paper manufacture considerably more expensive.

An alternative is hereby provided by the process according to Federal Republic of Germany Patent Specification No. 35 00 408 which discloses the use of a cationic dicyandiamide resin as fixing or flocculation agent since, under neutral to weakly basic conditions, this flocculates natural and synthetic sizing agents which can be fixed on to the fibres. Although this resin already possesses a good action in the neutral range, a further optimization with regard to the working range is desirable.

Therefore, it is an object of the present invention to provide a flocculation and/or fixing agent for paper sizing in a weakly acidic to weakly basic pH range which does not display the disadvantages of the prior art but rather displays an excellent action with regard to the precipitation or fixing properties in the whole of the working range.

Thus, according to the present invention, there is provided a flocculation and/or fixing agent for paper sizing in the weakly acidic to weakly alkaline pH range, which contains or consists to a preponderant amount of a mixture and/or a co-condensation product of the components cationic dicyandiamide resin and polyaluminium hydroxy compound.

Surprisingly, we have found that the mixture or the co-condensation product according to the present invention is better than was to have been expected from the known action of the individual components, i.e. a synergistic effect is present.

The cationic dicyandiamide resin which can be present as component of the agent according to the present invention is described, for example, in Federal Republic of Germany Patent Specification No. 35 00 408.

This resin can be produced, for example, by reacting 1 mole of dicyandiamide with 1.0 to 4.0 moles of formaldehyde in the presence of 0.1 to 2.0 mole of an inorganic or organic acid and/or of an ammonium or amine salt of an inorganic or organic acid and optionally of 0.05 to 0.5 mole of a mono- or polybasic amine.

As inorganic acid, there can thereby be used, in particular, hydrochloric acid, sulphuric acid or nitric acid and as organic acid formic acid, acetic acid or oxalic acid.

In the case of ammonium salts, ammonium chloride and sulphate, as well as ammonium formate and acetate, are preferred.

As amine salts, there are used, in particular, salts of organic amines, for example ethylenediamine formate or triethylenetetramine hydrochloride.

As amine components possibly also to be used, there can be employed di- or polybasic amines in which case ethylenediamine, propylenediamine, diethylenetriamine and triethylenetetramine, as well as substituted derivatives, such as mono- or diethanolamine, are preferred.

The cationic dicyandiamide-formaldehyde resins have pH values of from 3 to 5, are miscible with water in all proportions and can readily be used as 30 to 60% aqueous solutions.

The second component of the agent according to the present invention is a polyaluminium hydroxy compound which preferably has an aluminium oxide content of from 5 to 20%.

The polyaluminium hydroxy compounds employed according to the present invention can be used in the form of salts with conventional inorganic anions, for example chloride or sulphate anions, as well as organic anions, for example formate or acetate ions.

If the two components, i.e. cationic dicyandiamide resin and polyaluminium hydroxy compound, are used in the form of a mixture, then a mixing ratio of 60:40 to 5:95 is preferred because the synergistic effect is especially strongly marked in this range.

Instead of a mixture of these two components, there can be used wholly or partly a co-condensation product of a cationic dicyandiamide resin and a polyaluminium hydroxy compound, the co-condensation product thereby displaying an even better action and storage stability than a mixture of the individual components.

The ratio of polyaluminium hydroxy compound and cationic dicyandiamide resin in the co-condensation product can be varied within wide limits but, in practice, a mole ratio of aluminium to dicyandiamide of 4:1 to 1:4 has proved to be especially advantageous.

The production of the flocculation or fixing agent according to the present invention does not give rise to any problems and can be accomplished without great technical expense.

The production of the mixture of cationic dicyandiamide resin and polyaluminium hydroxy compound takes place by simple mixing of the components in the desired ratio, advantageously at ambient temperature, with conventional technical mixing apparatus.

Various methods can be used for the production of the co-condensation product because the incorporation of the polyaluminium hydroxy compound into the cationic dicyandiamide resin can be undertaken at practically any stage of the condensation reaction. An especially simple way consists in mixing the cationic dicyandiamide resin with the polyaluminium hydroxy compound in aqueous solution and heating this solution, preferably to about 50° to 120° C. Depending upon the temperature, the co-condensation is ended after about 10 to 120 minutes.

Alternatively, the polyaluminium hydroxy compound can be added during the condensation of the dicyandiamide resin or, in a preferred embodiment, precursors of the polyaluminium hydroxy compound are first taken in the form of ammonia and aluminium salts, for example aluminium chloride or aluminium sulphate, and the polyaluminium hydroxy compound is produced intermediately. In practice, not only a one-step but also a two-step process method has hereby proved to be useful. In the case of the one-step process, ammonia and aluminium salt are taken. Subsequently, the further components of the resin, namely formaldehyde and dicyandiamide, are added thereto and the reaction mixture subsequently heated. From ammonia and the aluminium salt, the polyaluminium hydroxy compound is thereby formed as an intermediate, as well as the ammonium salt necessary for the formation of the cationic dicyandiamide resin. For this reason, the amounts of ammonia and aluminium salt are to be adjusted corresponding to the desired mole ratio.

In the case of the two-step process, ammonia and aluminium salt are again taken in the form of an aqueous solution and heated to 50° to 120° C. for the formation of the polyaluminium hydroxy compound and ammonium salt. Subsequently, the reaction mixture is cooled, formaldehyde and dicyandiamide are added thereto and then the reaction mixture is again heated in order to carry out the co-condensation reaction. After completion of the co-condensation, the reaction solution is cooled. The temperature for carrying out the co-condensation is normally from 50° to 120° C.

The concentration of the aqueous solution should be so chosen that solids contents of co-condensation products of from 30 to 60% by weight are obtained. The co-condensation products can be used in this form without further working up.

For carrying out the condensation reaction, no special measures are necessary in order to maintain definite pH values since the reaction components regulate the pH value in such a manner that it lies in the acid range. The final co-condensation products then usually have a pH value of from 1 to 5.

The mixtures or co-condensation products according to the present invention are used in paper sizing in the form of aqueous solutions, namely, in an amount of from 0.1 to 5% by weight solids content of the agent, referred to the dry weight of the paper, this amount preferably being from 0.2 to 1% by weight.

The flocculation or fixing agent according to the present invention is outstandingly suitable for commercially available sizes of natural or synthetic basis. In the case of natural sizes, there can hereby be especially mentioned colophony, animal glue, casein, starch, waxes, fatty acids and tall resins and in the case of synthetic sizes those based upon ketene dimers, acrylic acids, maleic acid anhydrides and polyvinyl acetates. In the same way, the agents according to the present invention can also be used for modified sizes, for example colophony modified with dienophilic acids.

There are also no limitations with regard to the filling materials and pigments usual in the case of paper manufacture, i.e. all conventional filling materials are readily compatible with the agents according to the present invention.

The flocculation or fixing agent according to the present invention ensures a practically complete flocculation of the size not only in a weakly acidic but also in a weakly alkaline pH range and thus provides the prerequisite for a good and problem-free sizing in the case of neutral and pseudoneutral sizing.

The following Examples are given for the purpose of illustrating the present invention.

EXAMPLE 1

Production of Co-Condensation Product P1 by Mixing and Subsequent Heating of the Components 100 Parts by weight of a polyaluminium hydroxy chloride (PAC) solution (64%, aluminium oxide content 18%) and 128 parts by weight of cationic dicyandiamide resin (50%, prepared according to the Example of Federal Republic of Germany Patent Specification No. 35 00 408) were mixed, heated to 100° C. for 10 minutes and subsequently again cooled. The co-condensation product had a pH value of 2.0 and a solids content of 55% (determination 1 hour at 120° C.).

EXAMPLE 2

Production of various mixtures consisting of cationic dicyandiamide resin (DCD resin) in the form of a 50% aqueous solution (produced according to the Example of Federal Republic of Germany Patent Specification No. 35 00 408) and polyaluminium hydroxy chloride (PAC) corresponding to Example 1 as a 64% solution by mixing at ambient temperature in the following solid material ratios:

| product | solid material ratio |
| --- | --- |
| P2 | 1 part by weight of DCD resin + 2 parts by weight PAC |
| P3 | 1 part by weight of DCD resin + 3 parts by weight PAC |
| P4 | 1 part by weight of DCD resin + 4 parts by weight PAC |

EXAMPLE 3

Production of Co-Condensation Product P5 (One-Step)

Into 60 parts by weight of water were stirred, after the addition of 68 parts by weight of 25% aqueous ammonia solution, 120.7 parts by weight of solid aluminium chloride hexahydrate. After the addition of 62.5 parts by weight of 30% aqueous formaldehyde solution and 21.0 parts by weight of dicyandiamide, the mixture was heated to 100° C. and condensed for 2 hours at this temperature. After cooling, the co-condensation product had a pH value of 2.6 and a solids content of 45% (determination 1 hour at 120° C.).

EXAMPLE 4

Production of Co-Condensation Product P6 (Two-Step)

To 231.4 parts by weight of 29% aqueous aluminium chloride solution were added dropwise, with stirring, 68 parts by weight of aqueous 25% ammonia solution. After completion of the addition, the mixture was heated for 1 hour at 100° C. After cooling to 60° C., 125 parts by weight of 30% aqueous formaldehyde solution and 42 parts by weight of dicyandiamide were added thereto and the solution was heated for 1 hour at 100° C. After cooling, the solution had a pH value of 2.8 and a solids content of 38% (determination 1 hour at 120° C.).

EXAMPLE 5

In order to demonstrate the effectiveness of the agent according to the present invention, the flocculation behaviour thereof was investigated on a commercially available modified resin size (Roscol).

The flocculation was carried out in water with 30° dH (German hardness). 1000 ppm of the solid size were dispersed in the water. Referred to the size, in the experiments there were then added thereto the flocculation or fixing agent in amounts of from 10 to 500 ppm, followed by stirring and filtering. The turbidity of the filtrates was assessed, the following value numerals thereby being given:

6 = white (no precipitation)
5 = very turbid (precipitation)
4 = turbid
3 = slightly turbid
2 = almost clear
1 = clear As can be seen from the following Table 1, the products P1, P2 and P6 according to the present invention showed a distinctly better flocculation action than the cationic dicyandiamide (DCD) resin (produced according to the Example of Federal Republic of Germany Patent Specification No. 35 00 408) and polyaluminium hydroxy chloride (PAC) in the form of the commercially available product Prodefloc AC 190.

TABLE 1

| product | Flocculation of Roscol ppm addition | | | | | | | | | | | |
|---|---|---|---|---|---|---|---|---|---|---|---|---|
| | 10 | 20 | 30 | 40 | 50 | 60 | 100 | 190 | 200 | 310 | 400 | 500 |
| DCD resin | 5 | 4 | 3.5 | 3 | 3 | 3 | 3 | 3 | 4 | — | — | — |
| PAC (comparison) | 5 | 5 | 4 | 4 | 4 | 3.5 | 3 | 3 | 3 | — | — | — |
| p1 | 6 | 4 | 3 | 2 | 2 | 2 | 2 | 2 | 2 | 2 | 2 | 2 |
| P2 | 6 | 6 | 3 | 3 | 2 | 2 | 2 | 2 | 2 | 2 | 2 | 2 |
| P6 | 6 | 3 | 2 | 2 | 2 | 1 | 1 | 1 | 2 | 2 | 2 | 2 |

EXAMPLE 6

Activity Determination of the Products According to the Present Invention at Different pH Values The activity of the products according to the present invention was determined by precipitation of the azorubin dyestuff (anionic sulpho acid azo dyestuff) in comparison with the cationic dicyandiamide (DCD) resin and the polyaluminium hydroxy chloride (PAC) according to Example 4. There was thereby determined the active material content of the flocculating optimum in comparison with the optimum in the case of flocculation with distilled water at pH 5. The optimum of the flocculation was determined after the filtration of the flocculated out dyestuff.

Method

To 54 kg. of tap water was added such an amount of 10% aqueous sodium hydroxide solution that, after the addition of the flocculation agent, the pH had reached the desired value. 6 ml. of 10% flocculation agent were then added to this solution. After standing for 3 minutes, this solution was added dropwise, with stirring, to 100 ml. of azorubin solution with 100 ppm dyestuff content until the optimum dyestuff flocculation was reached.

As the following Tables 2 and 3 show, the products according to the present invention displayed a distinctly better flocculation action than the polyaluminium hydroxy chloride alone. The products according to the present invention also showed a synergistic action, i.e. their activity was greater than that which corresponds arithmetically to the mixing ratio. This is shown, for example, in the case of the activity of P1:

| | calculated | found |
|---|---|---|
| pH 6 | 63.5% | 84% |
| pH 7 | 36% | 57% |
| pH 8 | 27.5% | 55% |

TABLE 2

Determination of the activity of flocculation agents at different pH values

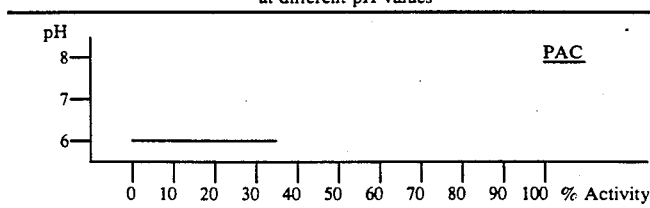

TABLE 2-continued

Determination of the activity of flocculation agents at different pH values

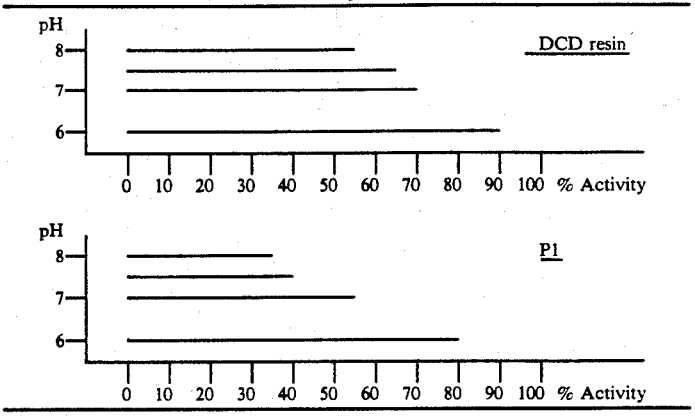

TABLE 3

Determination of the activity of flocculation agents at different pH values

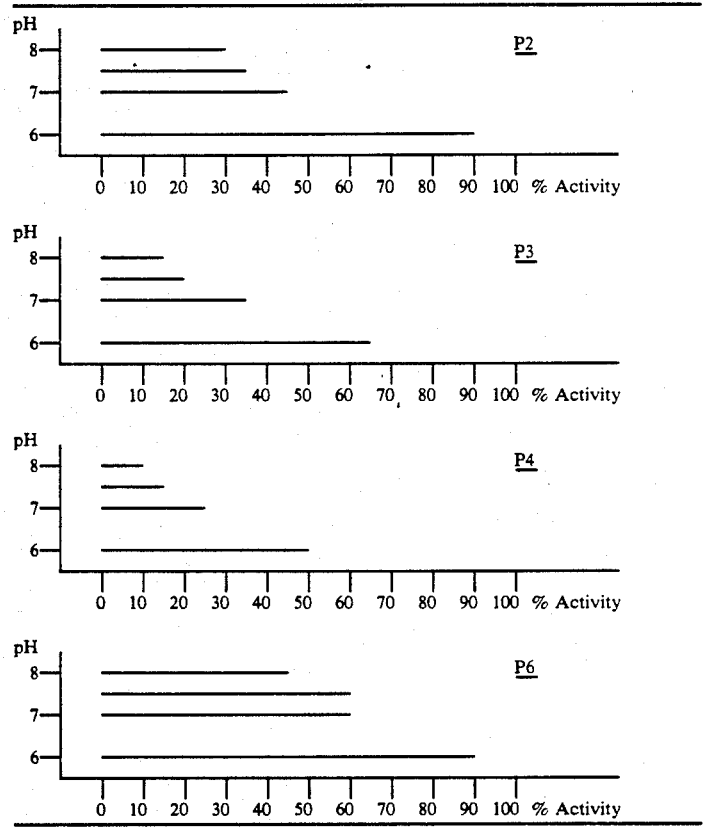

EXAMPLE 7

Sizing of a conventional white covering material consisting of waste paper and broken paper for the production of cardboard.

A brushed out covering pulp with 4% by weight stock density was diluted with sieve water to 1% by weight stock density. The pH value of the suspension was 8.4. After the addition of size, fixing agent and retention agent, sheets were produced on a laboratory sheet former and these investigated with the help of the Cobb test for the degree of sizing.

Conditions

Size type: natural modified resin size (Collodin B 433 S), additive 1% atro material Fixing agent: the following different products according to the present invention in comparison with cationic dicyandiamide resin and polyaluminium hydroxy chloride alone, additives 0.3%, 0.5% and 0.7% atro material:

1) cationic dicyandiamide resin (produced according to the Example of Federal Republic of Germany Patent Specification No. 35 00 408).

2) polyaluminium hydroxy chloride (Prodefloc AC 190)
3) P1
4) P2
5) P5

Retention agent: Percol 280 L.

Addition: To a 1% by weight pulp slurry was added, with stirring, the corresponding amount of size (1% atro material), after stirring for 60 seconds the given amount of fixing agent added thereto and, after stirring for a further 15 seconds, the retention agent was added thereto. The sheet formation took place 5 seconds thereafter. Immediately after drying, the Cobb value of the sheets formed was determined.

In the following Table 4, the results are summarised, a lower Cobb value thereby indicating a low water take-up, i.e. a better sizing.

As can be seen, with the help of the products according to the present invention, there is achieved a better sizing than with the use of cationic dicyandiamide resins or polyaluminium hydroxy chloride alone.

TABLE 4

| fixing agent | % agent | Cobb 60, average |
| --- | --- | --- |
| 1) cation. | 0.3 | 110 |
| DCD-resin | 0.5 | 61 |
| (comparison) | 0.7 | 76 |
| 2) PAC | 0.3 | 107 |
| (comparison) | 0.5 | 71 |

TABLE 4-continued

| fixing agent | % agent | Cobb 60, average |
| --- | --- | --- |
|  | 0.7 | 59 |
| 3) P1 | 0.3 | 102 |
|  | 0.5 | 57 |
|  | 0.7 | 47 |
| 4) P3 | 0.3 | 81 |
|  | 0.5 | 54 |
|  | 0.7 | 43 |
| 5) P5 | 0.3 | 86 |
|  | 0.5 | 59 |
|  | 0.7 | 44 |

We claim:

1. A flocculating and fixing composition for paper sizing in the weakly acidic to weakly alkaline pH range, which contains a preponderant amount of a co-condensation product of a cationic dicyandiamide resin and a polyaluminum hydroxy compound.

2. A composition of claim 1, wherein the cationic dicyandiamide resin is the reaction product of 1 mol of dicyandiamide with 1.0 to 4.0 mols of formaldehyde in the presence of 0.1 to 2.0 mols of an inorganic or organic acid or of an ammonium or amine salt of an inorganic or organic acid and optionally of 0.05 to 0.5 mol of a mono- or polybasic amine.

3. A composition of claim 1, wherein the polyaluminum hydroxy compound has an aluminum oxide content of from 5 to 20%.

4. A composition of claim 1, wherein the co-condensation product has a mol ratio of dicyandiamide to aluminum of 4:1 to 1:4.

* * * * *